United States Patent [19]

Mostosi

[11] Patent Number: 4,546,220
[45] Date of Patent: Oct. 8, 1985

[54] IMPROVED PLUG-IN ELECTRIC SWITCH

[75] Inventor: Angelo Mostosi, Bergamo, Italy

[73] Assignee: SACE S.p.A. Costruzioni Elettromeccaniche, Bergamo, Italy

[21] Appl. No.: 538,755

[22] Filed: Oct. 3, 1983

[30] Foreign Application Priority Data

Oct. 7, 1982 [IT] Italy ............................ 23119/82[U]

[51] Int. Cl.⁴ ............................................. H01H 9/20
[52] U.S. Cl. ................................ 200/50 AA; 200/323
[58] Field of Search ............ 200/50 A, 50 AA, 50 B, 200/153 G, DIG. 42, 61.19, 318, 323–325, 327

[56] References Cited

U.S. PATENT DOCUMENTS 3,110,778 11/1963 Edmunds ......................... 200/50 A
3,303,301 2/1967 Scott ............................. 200/50 A X Primary Examiner—G. P. Tolin
Attorney, Agent, or Firm—Diller, Ramik & Wight

[57] ABSTRACT

A plug-in electric switch which includes a mobile unit and a fixed unit, the fixed unit having a recess and a spring biased sliding plate, the mobile unit including a contact arm and main contacts, secondary contacts carried by both the mobile and the fixed units, a rod slidably mounted relative to and carried by the mobile unit, the rod having an end with an inclined face adapted to contact an inclined face of a slidably mounted latch, spring biasing the latch in a direction to maintain the faces in sliding contact, and another spring normally biasing the rod in a direction toward the contact or support arm such that when the main contacts are closed the mobile and fixed units are prevented from being disengaged or re-engaged and at a partially engaged position the main contacts cannot be closed.

16 Claims, 8 Drawing Figures

IMPROVED PLUG-IN ELECTRIC SWITCH

This invention relates to an automatic or non-automatic single or multi-pole plug-in electric switch, called hereinafter a isolable electric switch or simply a plug-in switch or switch for brevity.

Currently used plug-in electric switches are provided with safety mechanisms which prevent the switch being isolated or connected if the main contacts are closed. This is because the opening (for isolation) or the closure (for connection) of the secondary contacts which electrically connect the mobile unit to the base or fixed unit of the switch must take place with the main contacts open in order to prevent damaging and dangerous electric arcs between the secondary contacts.

One currently used safety mechanism comprises a type of hook rigid with the fixed unit which, on isolating or connecting the switch, moves the counter-lever which automatically releases the switch control lever, so as to open the main contacts if these are closed.

This safety mechanism is however completely ineffective if the main contacts have become welded together.

In this respect, the counter-lever releases the toggle lever system which connects the control lever to the arms carrying the mobile main contacts, so as to operate the springs which, by acting on said lever system, return the contact support arms instantly into the "switch open" position. If however the main contacts are welded together, the arms are retained in the "switch closed" position, in spite of the release action determined by the movement of the counter-lever.

The object of this invention is to porpose a plug-in electric switch provided with a mechanism which prevents the mobile unit being separated from or engaged with the fixed unit of the switch both if the main contacts are in a normal closed state and if they are welded together.

This object is attained by a plug-in electric switch formed from a mobile unit comprising main contacts which can be opened by rigidly interconnected contact support arms, and a fixed unit connected to said mobile unit by way of secondary contacts, characterised in that said arms are linked to a latch slidable in a guide in said mobile unit in correspondence with a stop element connected to said fixed unit, in order for said latch to be urged, when said main contacts are closed, into a position in which it projects from said guide such as to engage with said stop element when the switch is connected and to abut against stop element when the switch is isolated, and to be urged, when said main contacts are open, into a position in which it is retracted into said guide and is completely unrestrained by said stop element.

The latch thus prevents the mobile unit being separated from or engaged in the fixed unit of the switch when the main contacts are joined together, independently of whether they are welded together or in a normal closed state. In this respect, the latch is linked to the contact support arms, and thus acts exclusively in accordance with their operating position.

One embodiment of the present invention is described hereinafter by way of non-limiting example with reference to the accompanying drawings, in which.

Figure 1:
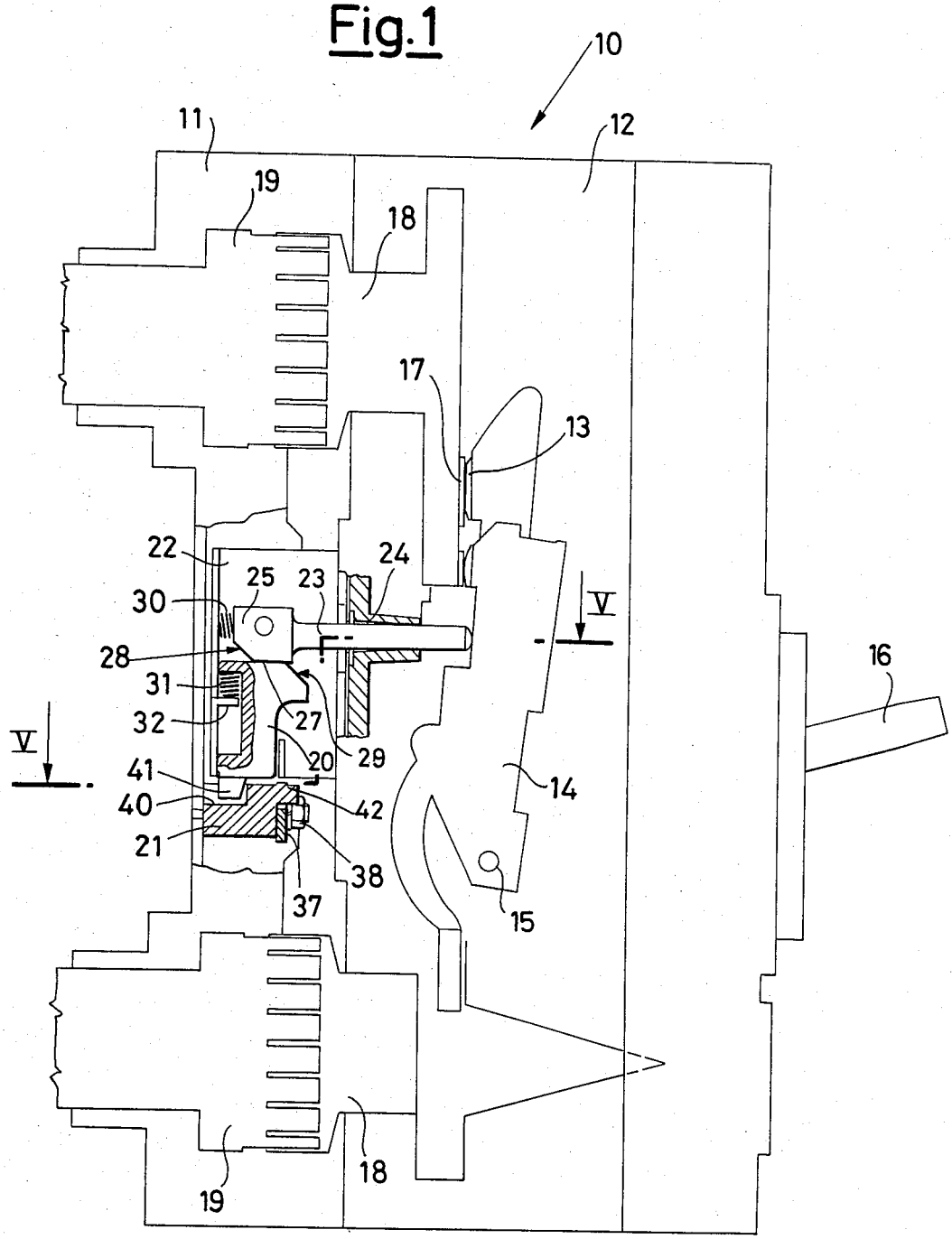
FIG. 1 is a partial section on the line I—I of FIG. 5 through a three-pole plug-in switch comprising a latch mechanism according to the invention, the switch being in the "connected with main contacts closed" configuration.

The illustrated plug-in electric switch, indicated overall by 10, is formed from a fixed unit 11 and a mobile unit 12, in accordance with a known configuration.

The unit 12 contains the main contacts. The mobile main contacts, indicated by 13, are carried by relative contact support arms 14 rigidly interconnected along a rotation shaft 15. By means of lever systems and springs, not shown, an external grip 16 enables the arms 14 to be operated instantly in order to move them either into a "switch closed" position (FIG. 1) with the mobile main contacts 13 engaged with the fixed main contacts 17, or into a "switch open" position (FIG. 2) with the contacts 13 withdrawn from the contacts 17. The unit 12 also contains the mobile secondary contacts indicated by 18, which are electrically connected to the main contacts 17.

The unit 11 merely includes the fixed secondary contacts, which are indicated by 19 and connected to the electrical line to be interrupted.

The switch can be isolated by separating the mobile unit 12 from the fixed unit 11, and by separating the mobile secondary contacts 18 from the fixed secondary contacts 19. The switch is returned to its "connected" position by re-inserting the mobile unit 12 into the fixed unit 11 and reconnecting the secondary contacts. To ensure maximum safety during these operations, they must be carried out with the main contacts open. For this purpose, the mobile unit 12 is provided according to the invention with a latch 20 linked to the central arm 14 (and thus indirectly also to the other two lateral arms 14 which are rigidly connected to the central arm 14) and operating on a passive element 21 mounted in the fixed unit 11 in correspondence with the latch 20.

The latch 20 is slidable in the direction of the element 21 in a guide 22 which is substantially of U section and is fixed to the mobile unit 12.

The linkage between the latch 20 and the central arm 14 is formed by means of a rod 23 guided so that it slides in a seat 24 provided in the inner structure of the mobile unit 12. The rod 23 acts at one end against the central arm 14, while at its other end it carries a block 25 held in the guide 22. A spring 30 acting on the guide 22 resiliently urges the block 25 and thus the rod 23 against the central arm 14. A spring 31 acting on a projection 32 of the guide 22 resiliently urges the latch 20 against the block 25. As the rod 23 travels, the block 25 and the latch 20 slide one on the other. Specifically, as the rod 23, block 25 and latch 20 undergo rectilinear movement from right to left with reference to FIG. 3 (from the position shown by dashed lines to the position shown by full lines), two faces 28 and 29 respectively which are disposed inclined to the sliding direction of the rod 23 firstly slide one on the other, and then a further two faces 26 and 27 respectively, disposed along said direction of sliding of the rod 23, slide one on the other. The opposite sequence occurs as the rod 23 moves from left to right. When the two faces 28 and 29 slide one on the other, the interference between them due to their inclination to the sliding direction of the rod 23 causes the latch 20 to move along its guide 22 between a position in which it is retracted into the guide 22 and a position in which it projects therefrom by way of its tooth 41. The faces 26 and 27 however slide on each other without interference, as they lie along the sliding direction of the rod 23, and in this situation the latch 20 remains in its projecting position.

The element 21, on which the latch 20 acts, is mounted slidable at its ends by way of two slots 33 and 34 which lie over two respective pins 35 and 36 rigid with the fixed unit 11. A plate 37, mounted on the pins 35 and 36 and locked there by two nuts 38, retains the element 21 on the pins 35 and 36 but without preventing its sliding thereon. A spring 39 contained in the slot 33, and acting against the element 21 and reacting against the pin 35, resiliently maintains the element 21 in an operating position. The element 21 comprises a cavity 40 which receives the terminal tooth 41 of the latch 20 when the switch 10 is in a determined operating configuration.

The operation of the described safety mechanism of the switch 10 is as follows.

When the switch 10 is in its "connected with main contacts closed" configuration (FIG. 1), the central arm 14 presses against the rod 23 in opposition to the spring 30, so keeping the block 25 with its face 26 in contact with the face 27 of the latch 20. The latch 20 is then in its projecting position, and its tooth 41 is engaged in the cavity 40 of the element 21. In this manner, the mobile unit 12 is fixed to the fixed unit 11. It is therefore impossible to isolate the switch 10 when the main contacts 13 and 17 are closed.

If said main contacts 13, 17, are opened (FIG. 2), the arm 14 releases the rod 23, which is urged towards it by the spring 30 until the block 25 abuts against the mouth of the seat 24, with the face 28 in full contact with the face 29 of the latch 20. In this position, the latch 20 is returned by the spring 31 into the guide 22, and thus the tooth 41 is disengaged from the cavity 40. It is then possible to isolate the switch 10 in perfect safety, by disengaging the mobile unit 12, which is no longer constrained to the fixed unit 11.

Figure 3:
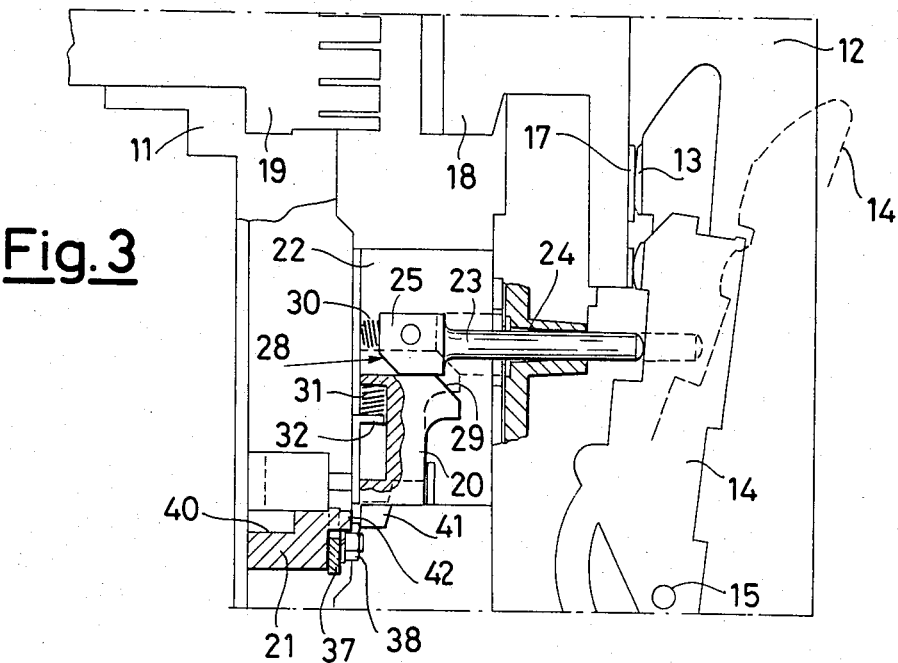
FIG. 3 is a partial view of the switch of FIG. 1 in the "isolated with main contacts closed" configuration.

The described safety mechanism also operates when re-inserting the mobile unit 12 into the fixed unit 11 (FIG. 3). In this respect, if the main contacts 13 and 17 are closed, the tooth 41 projects from the guide 22, and during the re-insertion operation it abuts against a portion 42 of the element 21 before the secondary contacts 18 and 19 close, so preventing operational re-engagement between the mobile unit 12 and fixed unit 11. If however the main contacts 13 and 17 are open, the tooth 41 is in a retracted position in the guide 22, and it is possible to completely re-insert the unit 12 into the unit 11, as there is no interference between the tooth 41 and element 21, this being apparent from the dashed lines of FIG. 3.

Figure 4:
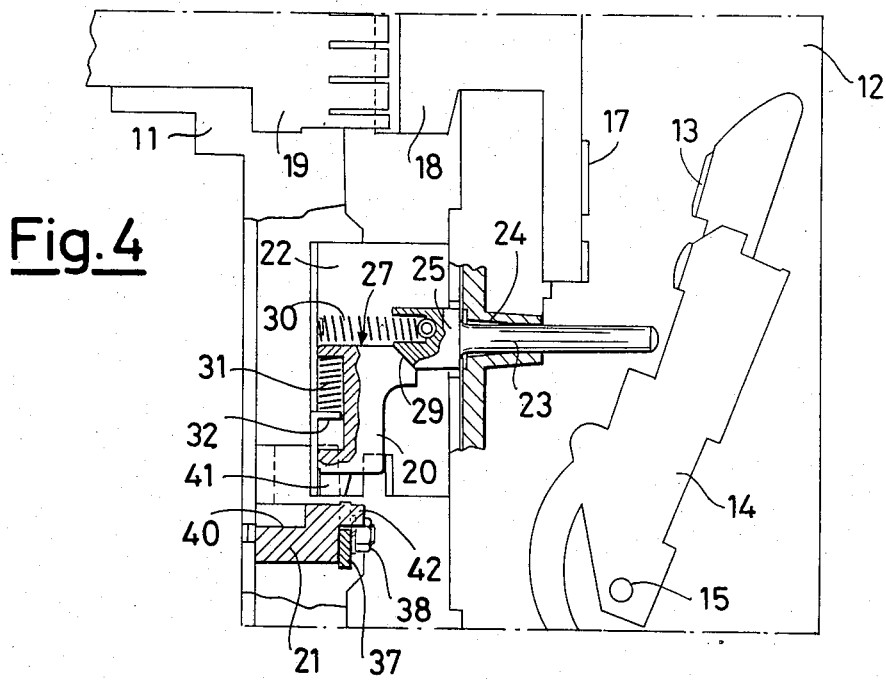
FIG. 4 is a partial view of the switch of FIG. 1 in the "partially isolated (or partially connected) with main contacts open" configuration.
Figure 5:
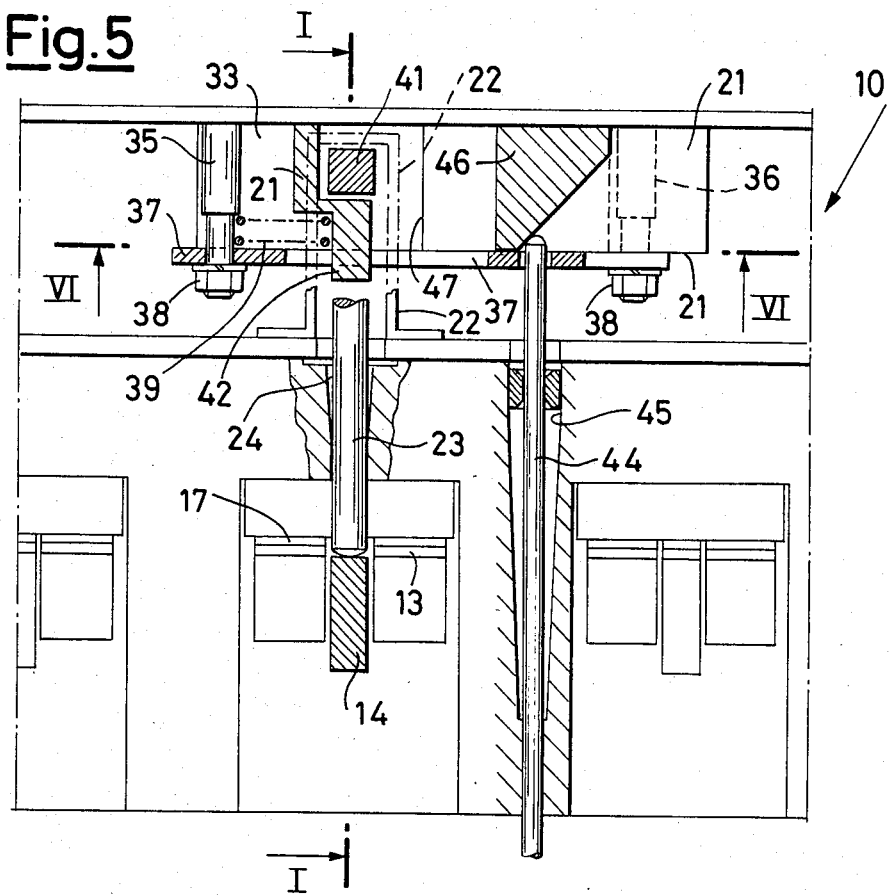
FIG. 5 is a partial section on the line V—V of FIG. 1.
Figure 6:
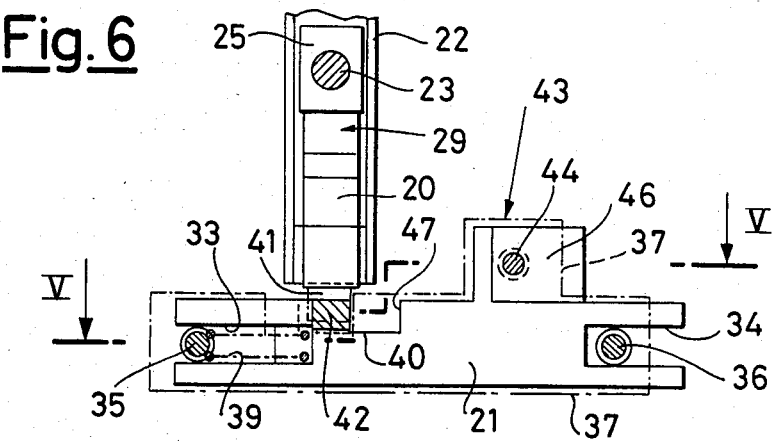
FIG. 6 is a partial section on the line VI—VI of FIG. 5.

If the re-insertion is incomplete, as shown in FIG. 4, the main contacts 13 and 17 cannot be closed. This is because before the end of the closure stroke of the central arm 14, and while the two surfaces 28 and 29 are still in contact, the tooth 41 abuts against the portion 42 to halt the stroke of the rod 23 and the central arm 14 which thrusts against it. The operator is thus warned of the irregular position of the moible unit 12.

Figure 2:
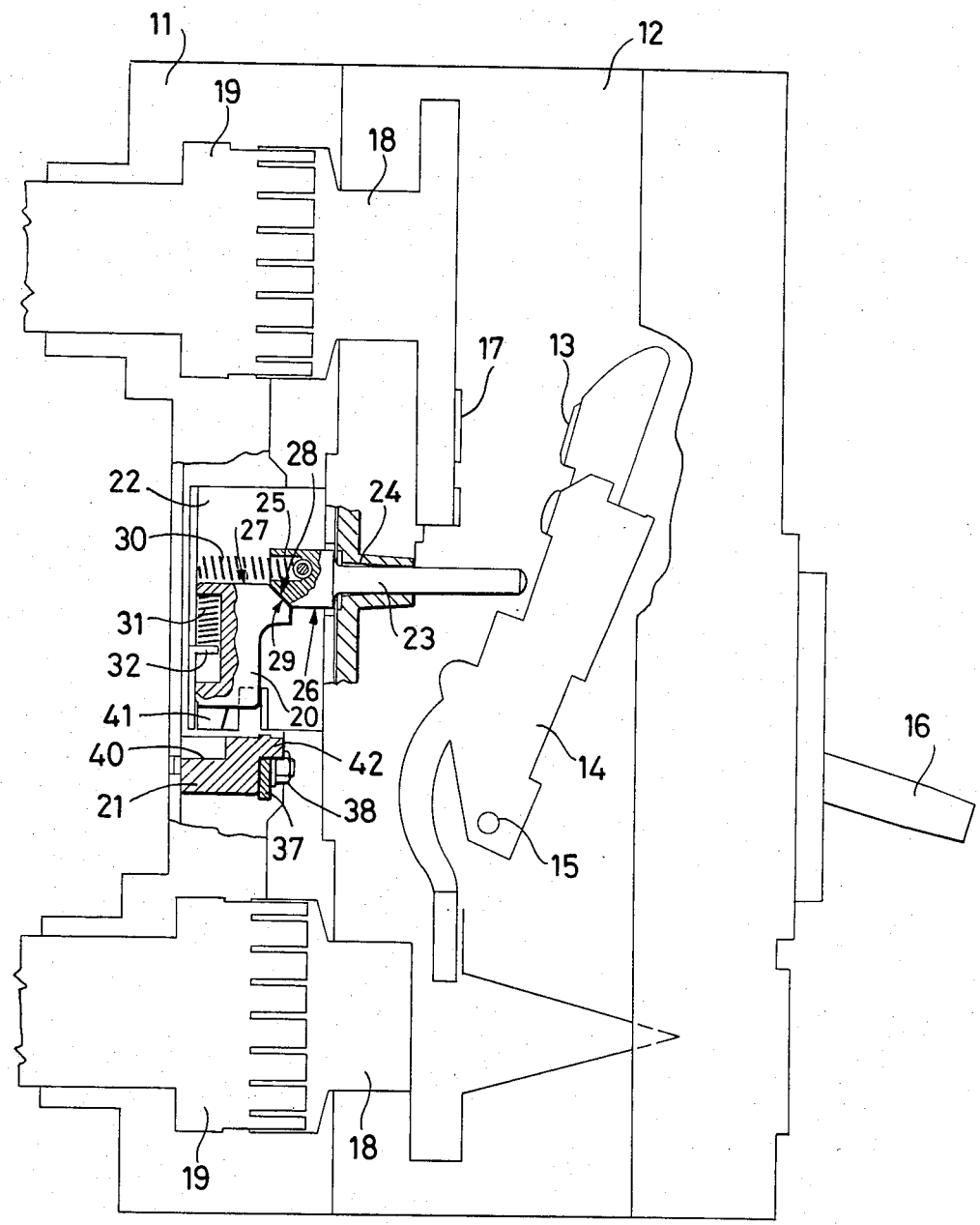
FIG. 2 shows the switch of FIG. 1 in the "connected with Main contacts open" configuration.

The described safety mechanism also comprises a device for the emergency manual release of the mobile unit 12 from the fixed unit 11 should the main contacts 13 and 17 be welded together (switch locked in the configuration of FIG. 1).

Figure 7:
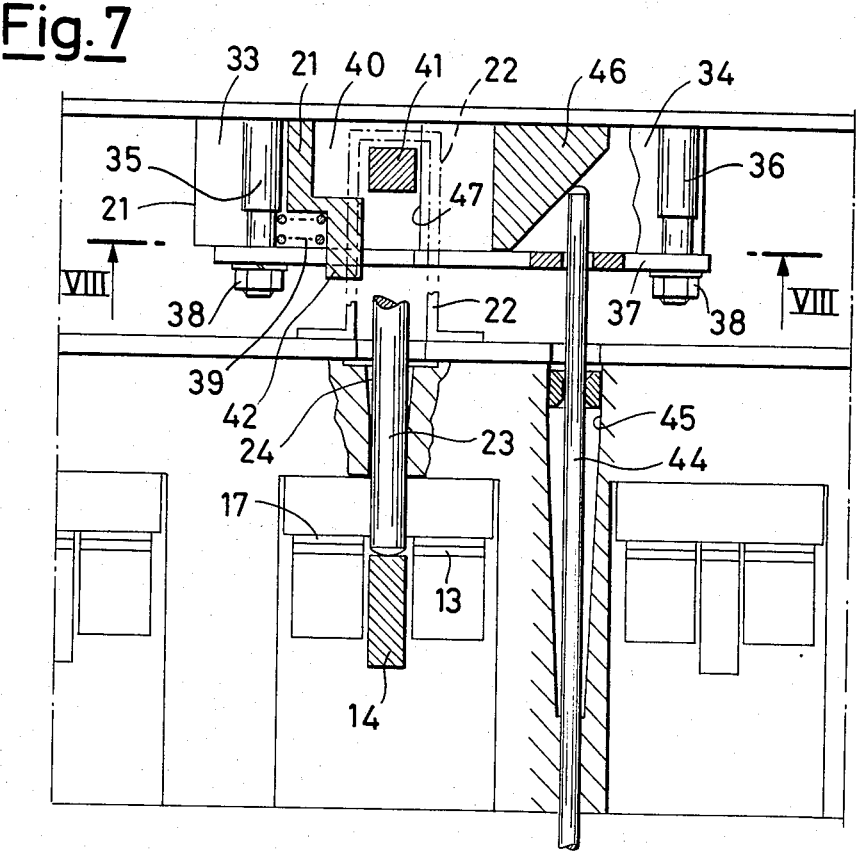
FIG. 7 shows the switch of FIG. 1 in the same sectional view as FIG. 5, but in a particular operational release position.
Figure 8:
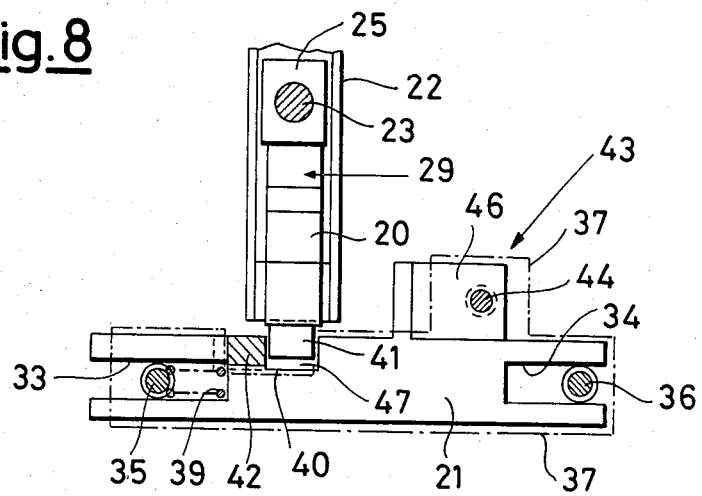
FIG. 8 is a partial section on the line VIII—VIII of FIG. 7.

In this respect, the element 21 comprises a projection 43 on which a free rod 44 is designed to operate. The rod 44 is inserted manually by the operator into a guide 45 in the internal structure of the mobile unit 12 towards the projection 43. The introduced point is then pushed against a face 46 of the projection 43 which is inclined to the sliding direction of the rod 44, so that the interference between this face and the point of the rod 44 causes the entire element 21 to move towards the pin 36 against the action of the spring 39. The element 21 must be moved until the tooth 41 is in a position corresponding with a passage 47 provided between the cavity 40 and the outer surface of the element 21 which faces the mobile unit 12 (FIGS. 7 and 8). In this position, it is thus possible to withdraw the mobile unit 12 from the fixed unit 11 for any necessary repairs, even though the main contacts 13 and 17 are closed, by virtue of the fact that the tooth 41 can be withdrawn from the cavity 40 through the passage 47.

Before doing this, the circuit must obviously be broken by means of another protection device.

It is apparent that modifications and/or additions can be made to the present embodiment.

In particular, the described linkages which connect the contact support arms to the latch and which form the release divice should the contacts be welded together, can be replaced by equivalent linkages.

I claim:

1. A plug-in electric switch comprising a mobile unit (12) and a fixed unit (11), said mobile unit (12) having main contacts (13, 17) opened and closed by a support arm (14) on the mobile unit, means (15) movably mounting said support arm (14) relative to said mobile unit (12) to effect opening of said main contacts (13, 17), secondary contacts (18, 19) removably connecting said fixed unit (11) to said mobile unit (12), said mobile unit (12) having guide means (22, etc.) slidably and nonrotatably guiding a latch (20) on said mobile unit relative to said mobile unit (12), means (21, etc.) carried by said fixed unit (11) for cooperatively effecting latching engagement with said latch (20) when said main contacts (13, 17) are closed and said latch (20) is in a first latching position and effecting unlatching disengagement of said latch (20) when said main contacts are open and said latch (20) is in a second unlatched position displaced from said first latched position, said latch (20) carries means (41) preventing latching engagement with said latching engagement effecting means (21, etc.) when said main contacts (13, 17) are closed and said mobile unit (12) is being plugged into said fixed unit (11), and also preventing said main contacts (13, 17) from closing by abuttingly engaging a portion (42) of said latching engagement effecting means (21, etc.) when said mobile unit (12) is incompletely connected to said fixed unit (11).

2. The plug-in electric switch as defined in claim 1 wherein said guide means (22, etc.) effect linear reciprocal sliding of said latch (20).

3. The plug-in electric switch as defined in claim 1 including means movably mounting a portion (37) of said latching engagement effecting means (21, etc.) relative to said fixed unit (11).

4. The plug-in electric switch as defined in claim 1 including means (35, 38, 39) movably mounting a portion (37) of said latching engagement effecting means (21, etc.) relative to said fixed unit (11), and means (44, 46) moving said latching engagement portion (37) to an inoperative position and permit unlatching engagement with said latch (20) even through said main contacts (13, 17) are closed.

5. The plug-in switch as defined in claim 1 including a rod (23) slidably movable relative to said mobile unit (12), said rod (23) having end portions operatively associated with said support arm (14) and said latch (20), and means (30) biasing said rod (23) in a direction toward said support arm (14).

6. The plug-in electric switch as defined in claim 1 including a rod (23) having opposite end portions, said rod (23) being slidably movable relative to said mobile unit (12), first means (30) biasing said rod (23) in a direction at which a first rod end portion is adjacent said support arm (14), a second rod end portion being adjacent said latch (20), said second rod end portion and latch (20) each having a face (12, 29) inclined to the direction of movement of said rod (23), said faces (28, 29) being in sliding contact with each other, and second means (32) biasing said latch (20) in a direction toward said second rod end portion to maintain said faces (28, 29) in contact with each other at least in one position of said rod (23).

7. The plug-in electric switch as defined in claim 1 including means movably mounting a portion (37) of said latching engagement effecting means (21, etc.) relative to said fixed unit (11), means (44, 46) moving said latching engagement portion (37) to an inoperative position and permit unlatching engagement with said latch (20) even though said main contacts (13, 17) are closed, said latching engagement portion mounting means including a pair of pins (35, 36) upon which said latching engagement portion is slidably mounted, and means (39) biasing said latching engagement portion to a position at which said latching engagement portion (37) effects latching engagement thereof with said latch (20).

8. The plug-in electric switch as defined in claim 1 including means movably mounting a portion (37) of said latching engagement effecting means (21, etc.) relative to said fixed unit (11), means (44, 46) moving said latching engagement portion (37) to an inoperative position and permit unlatching engagement with said latch (20) even though said main contacts (13, 17) are closed, said latching engagement portion mounting means including a pair of pins (35, 36) upon which said latching engagement portion is slidably mounted, means (39) biasing said latching engagement portion to a position at which said latching engagement portion (37) effects latching engagement thereof with said latch (20), said latching engagement portion moving means (44, 46) includes a rod (44) slidably mounted relative to said mobile unit (12) and an inclined face (46) carried by said fixed unit (11), said rod (44) having an end connected to said latching engagement portion and bearing against said inclined face (46), and said inclined face (46) being inclined in a direction counteracting the biasing force of said biasing means (39).

9. The plug-in electric switch as defined in claim 1 including means movably mounting a portion (37) of said latching engagement effecting means (21, etc.) relative to said fixed unit (11), means (44, 46) moving said latching engagement portion (37) to an inoperative position and permit unlatching engagement with said latch (20) even though said main contacts (13, 17) are closed, said latching engagement portion mounting means including a pair of pins (35, 36) upon which said latching engagement portion is slidably mounted, means (39) biasing said latching engagement portion to a position at which said latching engagement portion (37) effects latching engagement thereof with said latch (2), said latching engagement portion moving means (44, 46) includes a rod (44) slidably mounted relative to said mobile unit (12) an an inclined face (46) carried by said fixed unit (11), said rod (44) having an end connected to said latching engagement portion and bearing against said inclined face (46), said inclined face (46) being inclined in a direction counteracting the biasing force of said biasing means (39), said latching engagement effecting means (21, etc.) includes a tooth (41), and said latch (20) includes a cavity (40).

10. The plug-in electric switch as defined in claim 1 including a rod (23) slidably movable relative to said mobile unit (12), and said rod (23) and latch (20) slide along transverse paths of travel.

11. The plug-in electric switch as defined in claim 1 including a rod (23) slidably movable relative to said mobile unit (12), and said rod (23) and latch (20) slide along normal paths of travel.

12. The plug-in electric switch as defined in claim 9 wherein said latch (20) includes a tongue (41) and said latching engagement effecting means (21, etc.) includes a cavity (40).

13. The plug-in electric switch as defined in claim 12 including a rod (23) slidably movable relative to said mobile unit (12), and said rod (23) and latch (20) slide along transverse paths of travel.

14. The plug-in electric switch as defined in claim 10 including means (31) biasing said latch (20) in a direction toward said rod (23), and means (30) biasing said rod (23) in a direction toward said support arm (14).

15. The plug-in electric switch as defined in claim 13 including means (31) biasing said latch (20) in a direction toward said rod (23), and means (30) biasing said rod (23) in a direction toward said support arm (14).

16. The plug-in electric switch as defined in claim 14 wherein said rod (23) and latch (20) have inclined contacting faces (28, 29, respectively).

* * * * *